United States Patent
Feher

(10) Patent No.: US 7,272,936 B2
(45) Date of Patent: Sep. 25, 2007

(54) VARIABLE TEMPERATURE CUSHION AND HEAT PUMP

(76) Inventor: Steve Feher, 1 Keahole Pl. #1505, Honolulu, HI (US) 96825-3414

( * ) Notice: Subject to any disclaimer, the term of this patent is extended or adjusted under 35 U.S.C. 154(b) by 288 days.

(21) Appl. No.: 11/024,073

(22) Filed: Dec. 28, 2004

(65) Prior Publication Data

US 2006/0137358 A1 Jun. 29, 2006

(51) Int. Cl.
*F25B 21/02* (2006.01)
(52) U.S. Cl. .............................. 62/3.3; 62/3.4; 62/3.61
(58) Field of Classification Search ................... 62/3.2, 62/3.3, 3.4, 3.61, 239, 261, 326
See application file for complete search history.

(56) References Cited

U.S. PATENT DOCUMENTS

| | | | |
|---|---|---|---|
| 3,024,616 A | | 3/1962 | Bury |
| 3,136,577 A | * | 6/1964 | Richard .................. 297/180.11 |
| 3,723,189 A | | 3/1973 | Zahn |
| 4,006,604 A | | 2/1977 | Seff |
| 4,118,083 A | | 10/1978 | Lackey et al. |
| 4,592,208 A | | 6/1986 | Sollner et al. |
| 4,777,802 A | | 10/1988 | Feher |
| 4,884,304 A | | 12/1989 | Elkins |
| 4,923,248 A | | 5/1990 | Feher |
| 5,002,336 A | | 3/1991 | Feher |
| 5,033,136 A | | 7/1991 | Elkins |
| 5,117,638 A | | 6/1992 | Feher |
| 5,168,339 A | | 12/1992 | Yokotani et al. |
| 5,361,587 A | | 11/1994 | Hoffman |
| 5,375,421 A | | 12/1994 | Hsieh |

(Continued)

FOREIGN PATENT DOCUMENTS

WO WO 94/20801 9/1994

OTHER PUBLICATIONS

Feher Research; Variable Temperature Mattress Pad or Futon, (VTMP/F); yet2.com website printout; Aug. 8, 2004; 2 pgs.

(Continued)

*Primary Examiner*—Melvin Jones
(74) *Attorney, Agent, or Firm*—Robert J. Lauson; Lauson & Associate LLP

(57) ABSTRACT

A heat pump for use in a variable temperature cushion includes a housing with an inlet and a blower motor to draw in outside air to a two stage Peltier effect module that forms a sealed wall between a sub-cool side and a warm side of the housing. At the bottom of the housing are a pair of outlets and a condensate trap spanning across that facilitates condensate transfer from the cool side to the warm side for evaporation out of the warm side outlet. The heat pump also preferably includes a heat pipe from the warm side to the cool side to transfer heat and reheat the air (at a lower relative humidity) exiting through the cool outlet. Applications of the heat pump include a variable temperature cushion such as a seat and backrest, or bedding such as a pillow. An air conditioned pillowcase includes a pair of air impervious layers connected together forming a plenum with tubular spacer material inside and having a plurality of outlet vents around the perimeter. A multi-channel air duct connects the plenum to the heat pump, and further there is an optional noise cancellation system, both to minimize noise from operation of the heat pump.

23 Claims, 10 Drawing Sheets

U.S. PATENT DOCUMENTS

| | | |
|---|---|---|
| 5,720,315 A | 2/1998 | Palmer |
| 5,884,486 A | 3/1999 | Hughes et al. |
| 6,062,641 A | 5/2000 | Suzuki et al. |
| 6,085,369 A * | 7/2000 | Feher ............................ 5/423 |
| 6,158,224 A | 12/2000 | Hu et al. |
| 6,263,530 B1 | 7/2001 | Feher |
| 6,430,935 B1 | 8/2002 | Klett et al. |
| 2002/0116933 A1 | 8/2002 | Chu et al. |
| 2002/0121095 A1 | 9/2002 | Adamski et al. |
| 2003/0010050 A1 | 1/2003 | Scott |
| 2003/0066554 A1 | 4/2003 | Feher |
| 2004/0033161 A1 | 2/2004 | Kendall et al. |
| 2004/0083740 A1 | 5/2004 | Taban |
| 2004/0093965 A1 | 5/2004 | Hardcastle, III |

OTHER PUBLICATIONS

Feher; 931111, Thermoelectric Air Cond. Variable Temperature Seat (VTS) . . . ; Copyright 1998 Society of Automotive Engineers, Inc.; pp. 341-349.

Feher; 980661,Stirling Air Conditioned Variable Temperature Seat (SVTS) . . . ; Copyright 1998 Society of Automotive Engineers, Inc.; pp. 131-138.

Feher; Thermoelectric Variable Temperature Steering Wheel (VTSW); Feher Rearch Co.; Society of Automotive Engineers, Inc.

* cited by examiner

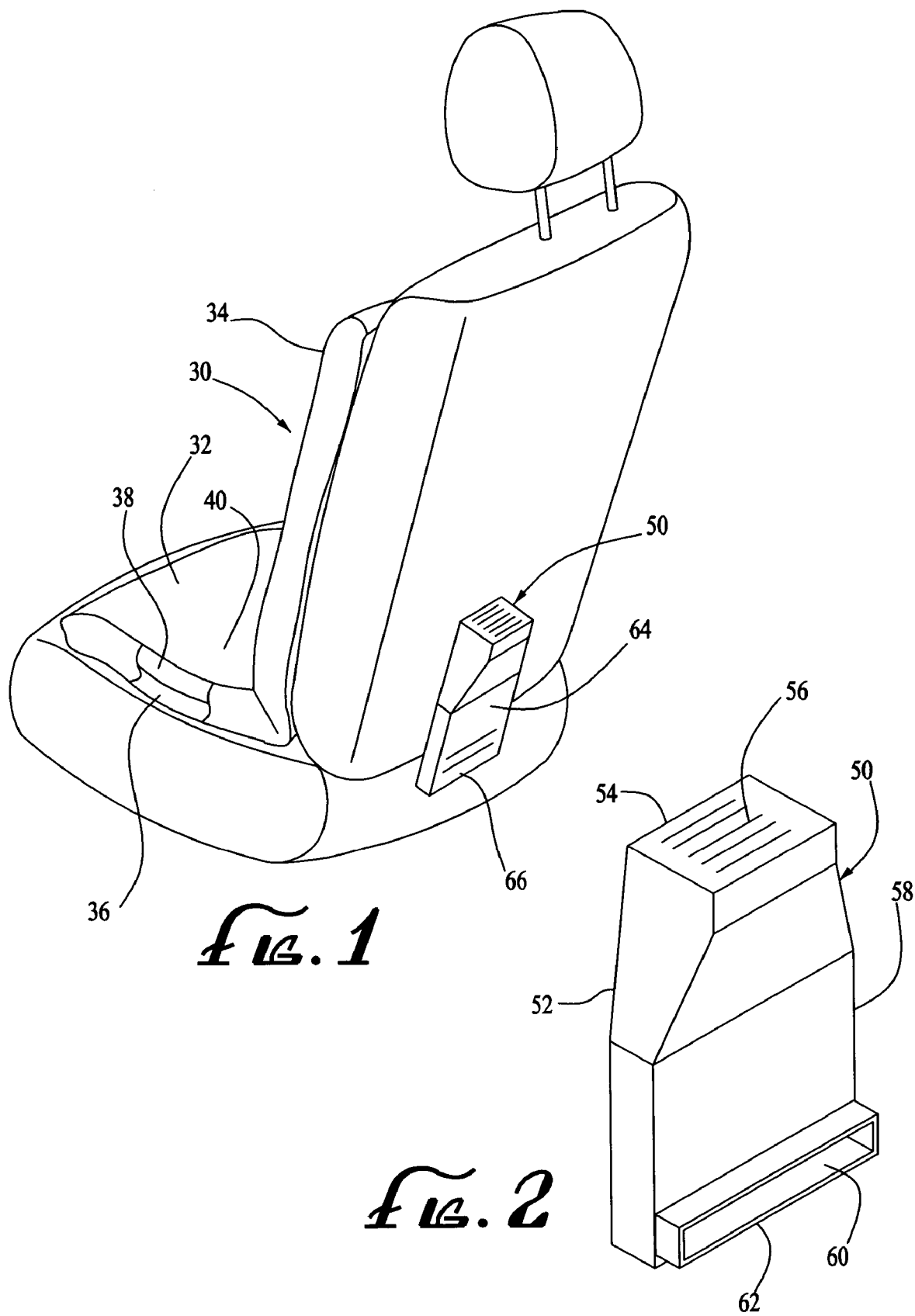

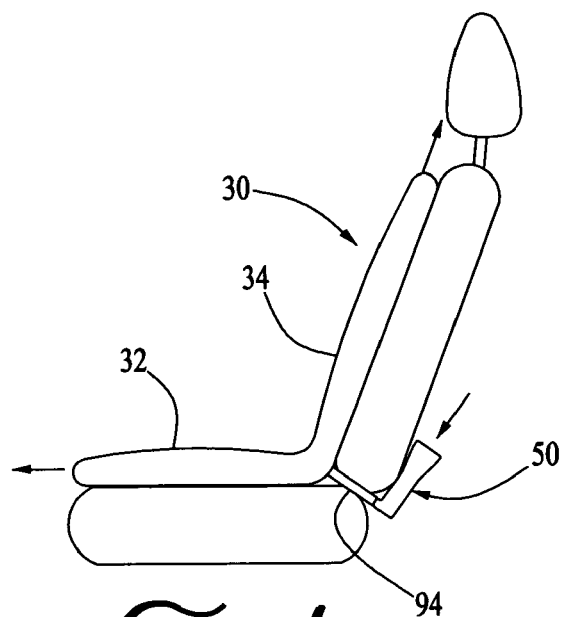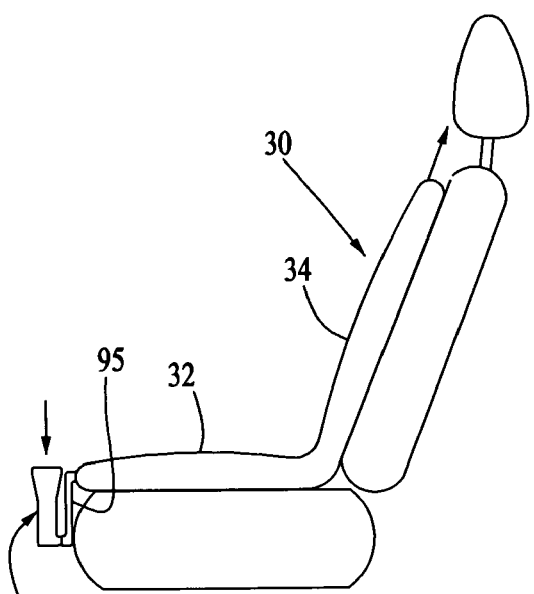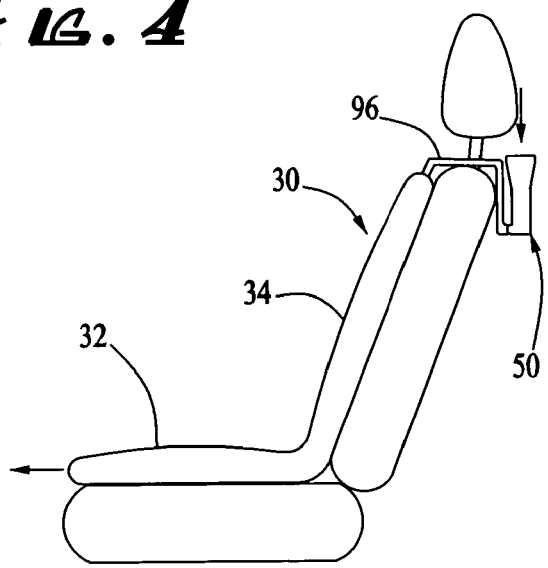

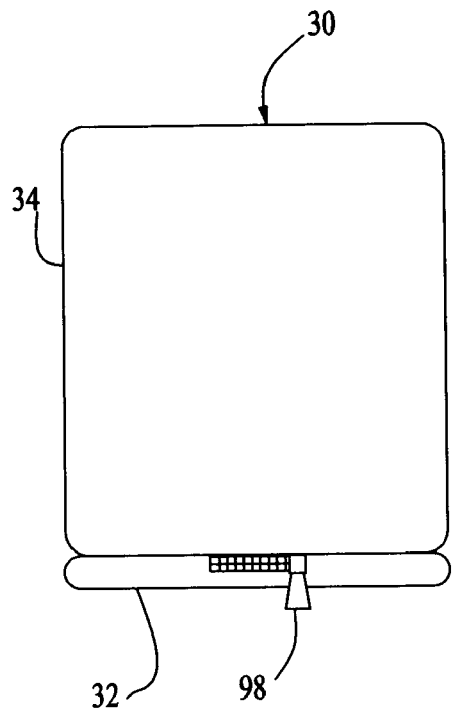
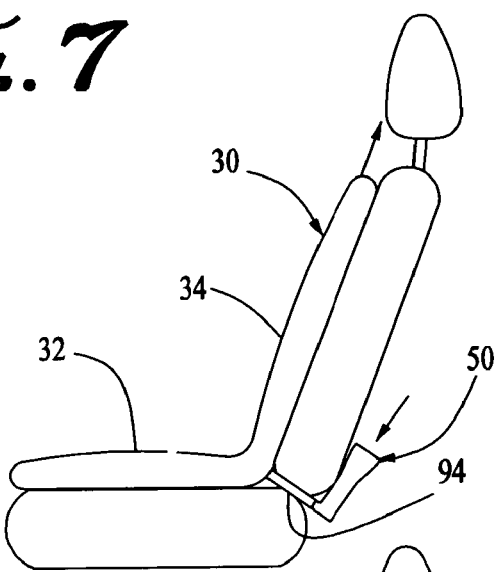
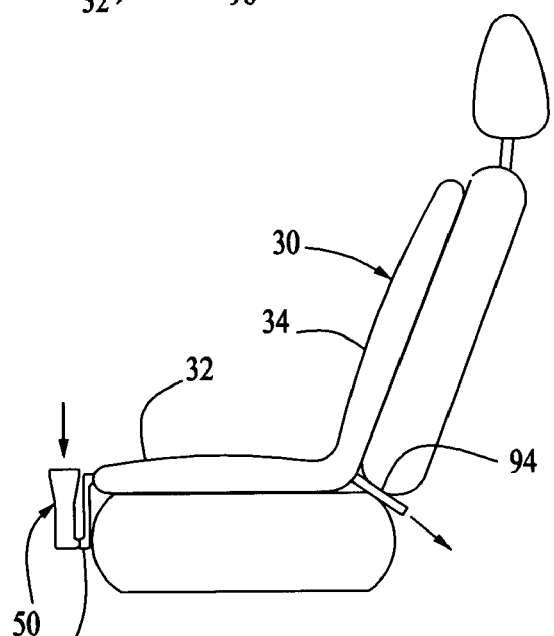
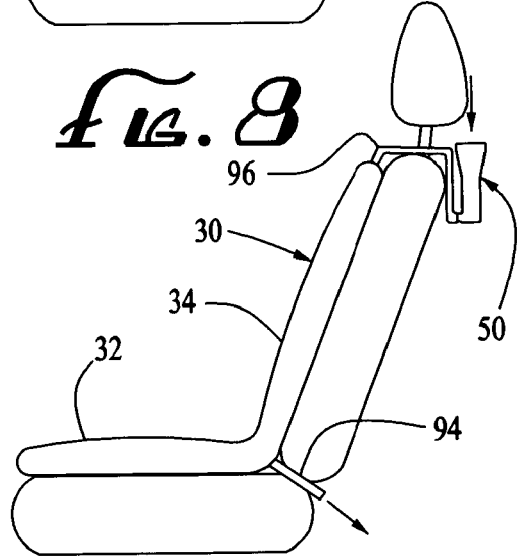

VARIABLE TEMPERATURE CUSHION AND HEAT PUMP

BACKGROUND OF THE INVENTION

1. Field of the Invention

The present invention relates to cushions or other devices that can be selectively cooled (or heated) by the user and an improved thermoelectric heat pump for use in such applications.

2. Description of the Related Art

Air-conditioned seats are a reality in many luxury-car brands being sold in the United States. The configuration and advantages of such seats were described in two of Steve Feher's recent patents, U.S. Pat. Nos. 6,263,530 and 6,085,369. These seats work satisfactorily such that they have become a popular option for Lexus, Lincoln and other automakers, but efforts are ongoing to improve the operating efficiency and compactness of the associated heat pumps to cool better, use less energy and occupy less space.

Besides merely reducing the temperature of the air within the seats and that bleeds through the seat covers, it would also be desirable to reduce the relative humidity of that air to enhance the user's comfort. To do so it is necessary to further cool the air below the dew point, dispose of the resulting condensation, and then reheat the air to a more comfortable temperature (but lower relative humidity) for distribution inside the seat. Preferably, the condensation is disposed of by evaporating it into the larger volume of air outside the seat. At the same time, it is desirable to reduce the electrical power requirements for the heat pump and decrease the volume of space required for the pump. These objectives are addressed by the subject disclosure which significantly improves the cooling element of today's air-conditioned seats.

As mentioned above, the technology of the present invention has other applications in addition to vehicle cushions, for example, bedding such as mattress pads and mattresses as mentioned in Steve Feher's '530 and '369 patents and as disclosed in his earlier U.S. Pat. No. 4,777,802. Additionally, Feher has been developing this technology specifically for use in pillows and pillow cases. Physiologically, the head is among the best places in the human body to remove heat from (or add heat to) because of the large amount of circulation in the head and scalp. Accordingly, effective cooling (or warming) of the human body can be achieved to a large extent by cooling (or warming) the head, providing improved user comfort in all types of weather, but especially hot, humid weather.

Conditioning the air inside a pillow or pillow case presents certain challenges, however. The pillow must be as quiet as possible since the user's ear may be in direct contact with the pillow. Further, attention should be paid to the sleeping surface of the pillow that it is kept as comfortable and aesthetically appealing as possible. These objectives are addressed as well in the disclosure that follows.

SUMMARY OF THE INVENTION

An improved thermoelectric heat pump includes a housing having an inlet opening at the top end, a blower motor mounted in an upper portion of the housing to draw in outside air and cause airflow into a lower portion of the housing. A thermoelectric device is mounted in the housing and forms a sealed wall between a cool side and a warm side of the lower portion of the housing and serves to channel the air flowing through the housing. A condensate trap is mounted at a bottom end of the housing and spans across the warm and cool sides of the housing, facilitating condensate transfer from the cool side to the warm side. The thermoelectric heat pump draws outside air in where it is cooled on the cool side and the heat transferred to the warm side, and cool air passes out the cool outlet and warm air out the warm outlet, and condensate transferred from the cool side to the warm side is evaporated out the warm outlet.

Preferably the thermoelectric device is a multi-stage Peltier effect module having a first and second stage. Preferably the first and second stages have conductor plates of approximately the same size and a shared conductor plate, and the first stage includes about 50% the volume of pellets as the second stage and the pellets are about evenly distributed across the first and second stages. The thermoelectric heat pump also preferably includes a heat pipe from the warm to the cool side of the lower portion of the housing, to transfer heat and warm up the air exiting through the cool outlet. Alternatively, a resistance-type heater may be used on the bottom end of the cool side. Preferably there are a number of heat exchanger fins projecting out from the thermoelectric device and the heat pipe.

One application of the thermoelectric heat pump is for a variable temperature cushion such as a connected seat and backrest, which has an interior volume defining a plenum that accepts pressurized conditioned air from an air duct from the cool outlet of the heat pump. The air duct and heat pump are preferably located proximate the middle portion of the cushion, and optionally there is a damper valve proximate this location to control the air flow within the cushion. The seating surfaces of the cushion cover are preferably air permeable material while the other sides are air impervious, and there is preferably a thin layer of padding beneath the cover. Inside the plenum is a layer of tubular spacer material to always allow air flow through the cushion, and there are preferably a plurality of vents in the plenum away from the middle portion of the cushion. The present invention may be sold as a variable temperature cushion or as kit of parts to convert a conventional cushion into a variable temperature one, or as an aftermarket cushion for placement atop a conventional vehicle seat.

Another application of the heat pump technology of the present invention is in the field of air-conditioned bedding, or variable temperature mattresses, mattress pads, pillows and pillowcases or the like. A variable temperature pillowcase includes a top and a lower air impervious layer connected together forming a plenum, further containing a tubular spacer layer and having a plurality of outlet vents around the perimeter of the plenum. The pillowcase preferably has an opening on one end sized to receive a conventional pillow below the tubular spacer layer. A multi-channel air duct connects the plenum to the heat pump to minimize the noise generated by the air flow through the hoses. Still further, there is an optional noise cancellation system including a microphone, a processor and a speaker for detecting a noise waveform and determining and broadcasting a waveform 180 degrees out of phase with the noise waveform.

These and other objects and advantages of the present invention will become apparent upon reading the following detailed description and upon reference to the accompanying drawings.

BRIEF DESCRIPTION OF THE SEVERAL VIEWS OF THE DRAWINGS

FIG. 1 is a rear perspective view of a variable temperature cushion and improved heat pump of the present invention installed on a conventional vehicle seat;

FIG. 2 is a front perspective view of the heat pump;

FIG. 4 is a cross-sectional view of the variable temperature cushion with heat pump installed at the bite line between the seat and backrest in accordance with a preferred embodiment;

FIG. 5 is a cross-sectional view of the heat pump installed at the front of the seat in accordance with an alternate embodiment;

FIG. 6 is a cross-sectional view of the heat pump installed at the top of the backrest in accordance with an alternate embodiment;

FIG. 7 is a front elevation view of the cushion with a damper valve for regulating the airflow;

FIG. 8 shows the modified airflow of FIG. 4 when the damper valve is closed;

FIG. 9 shows the modified airflow of FIG. 5 when the damper valve is closed;

FIG. 10 shows the modified airflow of FIG. 6 when the damper valve is closed;

LISTING OF REFERENCE NUMERALS

Figure 3:
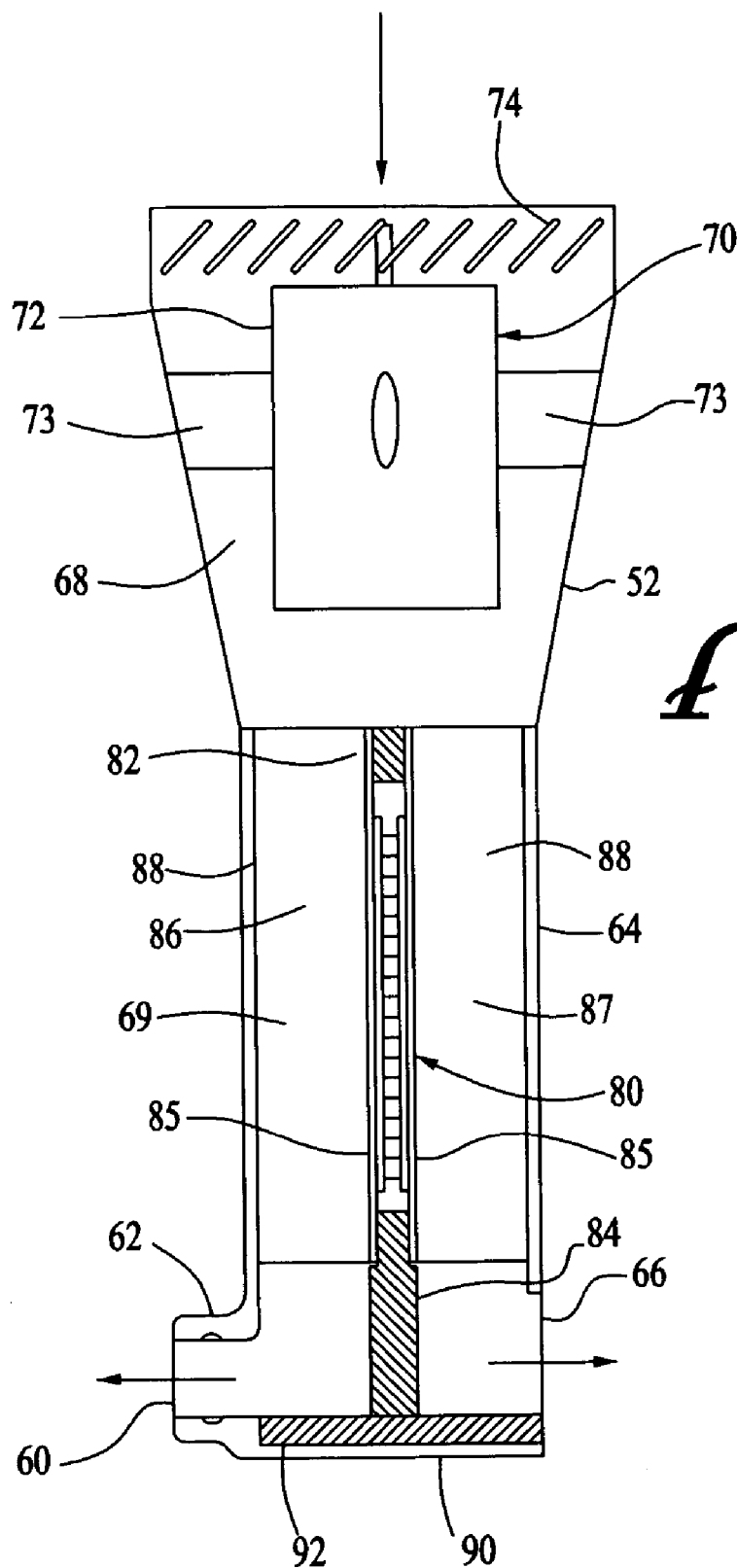
FIG. 3 is a cross-sectional view of the heat pump in accordance with a preferred embodiment.

| | |
|---|---|
| aftermarket variable seat cushion | 30 |
| seat rest | 32 |
| backrest | 34 |
| tubular spacer layer | 36 |
| padding layer | 38 |
| cushion cover | 40 |
| housing | 52 |

-continued

| | |
|---|---|
| top end | 54 |
| inlet opening | 56 |
| front side | 58 |
| outlet opening | 60 |
| mouth | 62 |
| rear side | 64 |
| outlet opening | 66 |
| upper portion | 68 |
| lower portion | 69 |
| vane-axial blower | 70 |
| blower motor | 72 |
| support strut | 73 |
| impellor blades | 74 |
| thermoelectric device | 80 |
| upper seal | 82 |
| lower seal | 84 |
| baseplate | 85 |
| cool side | 86 |
| warm side | 87 |
| upper heat exchanger fins | 88 |
| condensation trap | 92 |
| straight duct | 94 |
| special duct | 95 |
| special duct | 96 |
| damper valve | 98 |
| alternate thermoelectric heat pump | 100 |
| heat pipe | 102 |
| warm side outlet | 104 |
| cool side outlet | 106 |
| lower heat exchanger fins | 108 |
| two-stage Peltier effect module | 110 |
| alternate housing | 112 |
| upper seal | 114 |
| lower seal | 116 |
| second alternate heat pump | 120 |
| resistance heater | 122 |
| upper stage | 124 |
| lower stage | 126 |
| pellets | 127 |
| plate insulator | 128 |
| air-conditioned pillowcase | 150 |
| upper fabric layer | 152 |
| lower fabric layer | 154 |
| plenum | 156 |
| tubular spacer layer | 158 |
| batting layer | 160 |
| inlet nozzle | 162 |
| outlet vents | 164 |
| conventional pillow | 166 |
| pillow opening | 168 |
| miniature microphone | 170 |
| processing unit | 172 |
| playback speaker | 174 |

DESCRIPTION OF THE PREFERRED EMBODIMENTS

Initially referring to FIGS. 1-16, a variable seat cushion 30 and heat pump 50 may be described. The preferred embodiment is shown in terms of an aftermarket cushion 30 for placement atop a conventional vehicle seat, but alternatively the variable temperature hardware as described herein could be built into a new vehicle seat or sold as a kit of parts to convert a conventional vehicle seat into a variable temperature one selectively controlled by the user.

Now primarily referring to FIG. 1, the cushion 30 has a seat rest 32 and a backrest 34, and inside there is a tubular spacer layer 36 and an optional padding layer 38. Importantly, the tubular spacer layer 36 provides structure to facilitate flow of the air-conditioned air (described below) through the cushion 30 even when the user is seated on the seat rest 32 and leaning back against the backrest 34 which tends to compress the cushion 30 and cut off the airflow. The cushion cover 40 may be air permeable on the front and top seating surfaces or those on the seat rest 32 and backrest 34 contacted by the user, and is air-impervious on the back and all other outer surfaces of the cushion 30. The thin (approx. 0.125-0.25 inches in thickness) padding layer 38 prevents any "read through" or embossing or impressing of the underlying tubular spacer layer 36 into the cover 40 through repeated use of the cushion 30, while still allowing thermal transfer from the air flowing in the cushion 30 to the user's body. The optional padding layer 38 is an open-cell foam or a non-woven cotton or Dacron material, for example. For a complete description of the tubular spacer material 36 and padding layer 38, please see the Feher '530 and '369 patents referenced above.

Now also referring to FIGS. 2, 3, the improved heat pump 50 and its components may be described. The heat pump 50 includes a housing 52 having a top end 54 and an inlet opening 56. The front side 58 of the housing 52 has an outlet opening 60, and a mouth 62 built on to the outlet opening 60 for purposes that will be described below. The rear side 64 of the housing 52 also has an outlet opening 66. Note the varying shape of the housing 52 that is more square-like in horizontal cross-section in the upper portion 68 to accommodate a blower 70, and then tapering to a rectangular cross section in the lower portion 68 of the housing 52. Obviously other shapes for the various portions of the housing 52 may be employed, e.g. the upper portion 68 being circular.

Inside an upper portion 68 of the housing 52 is an integrated, single blower 70 including a blower motor 72 (held by a pair of support struts 73) and a number of impellor blades 74. A single, vane-axial blower 70 is shown but other types or quantities of blowers or any source(s) of pressurized air may be used. Further down in the housing 52 is a thermoelectric device 80, preferably a Peltier effect module, sandwiched between a pair of thin metallic baseplates 85 that along with an upper seal 82 and a lower seal 84 form a wall between a cool side 86 (main heat exchanger) and a warm side 87 (auxiliary heat exchanger) of the lower portion 69 of the housing 52. The single-stage Peltier module 80 is capable of lowering the temperature on the cool side 86 approximately 18 degrees Fahrenheit with a coefficient of performance or efficiency of approximately 50%. Attached to the baseplates 85 are approximately 36-42 very fine pitch metal heat exchanger fins 88 spaced apart and closely stacked one behind the other (approx. 18-21 fins per inch) to aid in transferring heat from the cool side 82 to the warm side 84. The fins 88 are preferably fabricated of copper (approx. 0.004 inches in thickness) or aluminum (approx. 0.006 inches in thickness) Across the bottom end 90 of the housing 52 is a condensation trap or wick evaporator 92 spanning from the warm side 86 to the cool side 87.

Referring to FIGS. 4-6, further details and features of the variable temperature cushion may be described. As shown in FIG. 4, preferably the heat pump 50 is installed proximate the "bite line" or separation between the seat rest 32 and backrest 34, with a straight air duct 94 running from the mouth 62 of the heat pump to the cushion 30. This set up is preferred as conditioned air entering the middle portion of the cushion is more easily evenly distributed throughout the seat rest 32 and backrest 34 portions. Alternatively, the heat pump can be installed forward of the seat rest 32 with a special air duct 95 (FIG. 5) or above and aft the backrest 34 with special duct 96 (FIG. 6). The air ducting 94, 95 is configured to keep the heat pump 50 generally vertically oriented to facilitate the condensate control as described herein, and is preferably made of a plastic material with low thermal conductivity as is the housing 52. Note the airflow through the cushion 30 depending upon where the heat pump 50 is placed, and the air exiting the cushion 30 remote from the heat pump 50. The set up with the heat pump 50 forward the seat rest 32 is advantageous in that the heat pump controls could be located directly on the unit and easily accessible between the user's legs when seated on the cushion 30. When the heat pump 50 is located aft of the user, a wired control extends to the user or to a location accessible to the user or a remote control could be used.

FIG. 7 shows a Zipper™ valve or damper 98 installed in the middle portion of the cushion 30. The damper valve 98 serves to control the air flow between the seat rest 32 and backrest 34 portions of the cushion 30. For example, when the heat pump 50 is installed at the bite line and the valve 98 is completely closed, air flows only through the backrest 34 and not the seat rest 32 (FIG. 8). Other examples, when the heat pump 50 is installed atop the backrest 34 and the valve 98 closed air flows again only through the backrest 34 (FIG. 9), or when the heat pump 50 is installed forward the seat rest 32 and the valve 98 closed air flows only through the seat rest 32 (FIG. 10), in both these instances the air exiting the cushion 30 through the duct 94 at the bite line.

Figure 11:
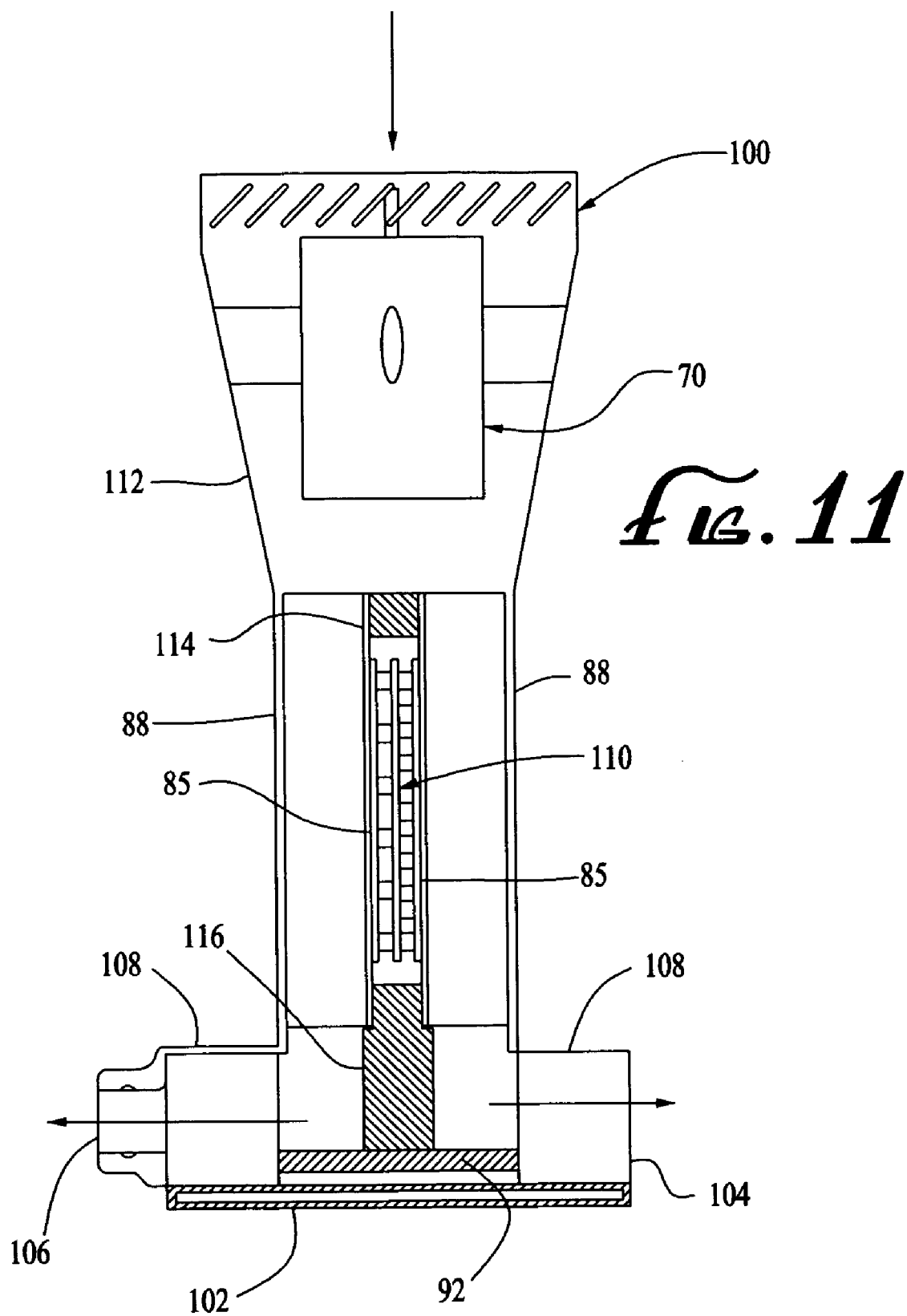
FIG. 11 is a cross-sectional view of the interior of a two-stage heat pump in accordance with a first alternate embodiment.
Figure 13:
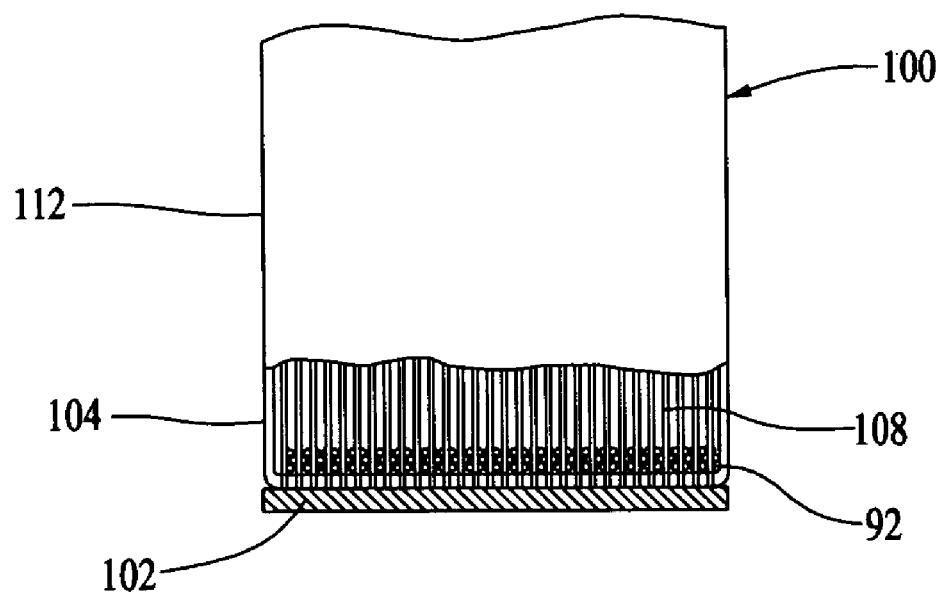
FIG. 13 is a rear elevation view of the first alternate embodiment with a portion of the housing broken away showing the warm side heat exchanger fins.

FIGS. 11, 13 show a first alternate embodiment thermoelectric heat pump 100, similar to the preferred embodiment heat pump 50 described above, but with a two-stage Peltier effect module 110 and second set of heat exchangers. The two-stage Peltier module 110 is suggested to increase the performance of the device to approximately 35 degrees Fahrenheit below ambient in cooling mode. The two stage device 110 may be of conventional construction as manufactured by Marlowe Industries, Dallas Tex. The purpose of further lowering the air temperature on the cool side of the device is to get it below the dew point, so a greater amount of humidity can be removed from the air and disposed of through the condensation trap 92. Additionally, then the air on the cool side is reheated approximately 15 degrees Fahrenheit to a more comfortable temperature (but lower relative humidity) by a passive heat pipe 102 transferring heat from the warm side outlet 104 over to the cool side outlet 106. There are approximately two (2) dozen lower heat exchanger fins 108 attached to the heat pipe 102 at the outlets 104, 106, again closely stacked one behind the other (appox. 18-21 per inch, 0.004-0.006 inches in thickness) as were the upper heat exchanger fins 88. Note the size and shape of the housing 112 is slightly enlarged to accommodate the additional hardware.

Figure 12:
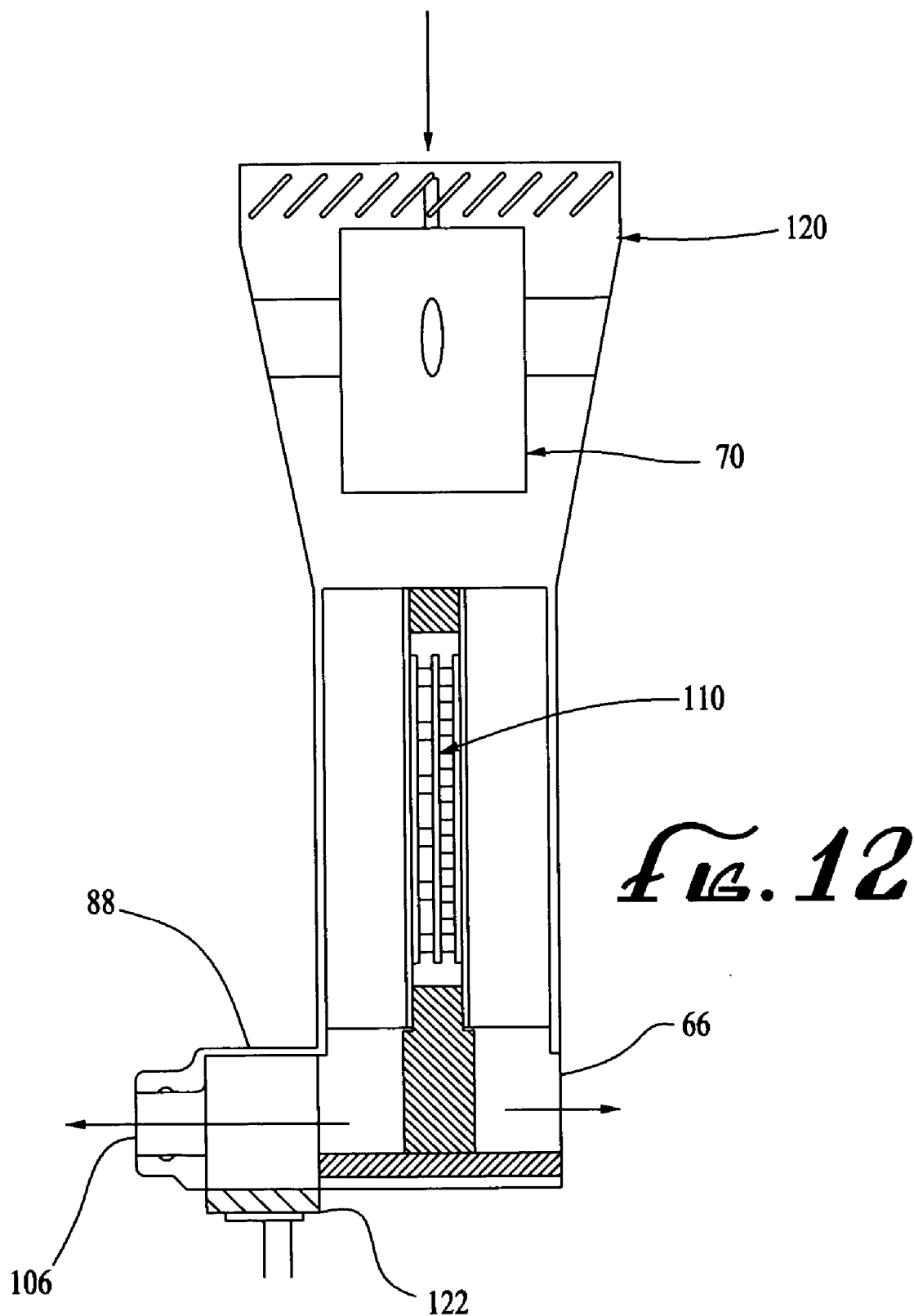
FIG. 12 is a cross-sectional view of a second alternate embodiment using a conventional heater rather than the heat pipe.
Figure 14:
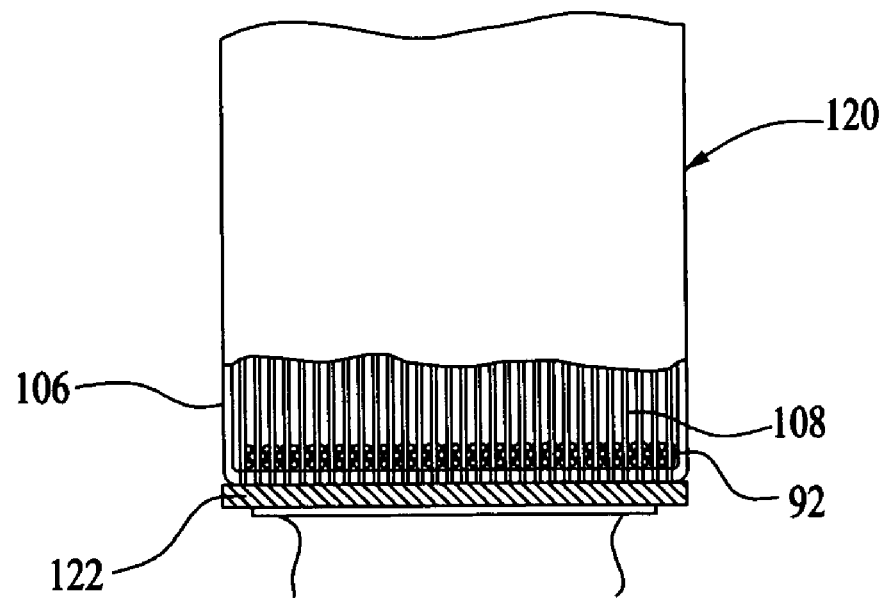
FIG. 14 is a front elevation view of the second alternate embodiment showing the cool side heat exchanger fins and the resistance heater.

FIGS. 12, 14 show a second alternate embodiment 120 where an active, electrical resistance heater 122 is used (instead of the heat pipe 102) to reheat the air. Hence, the heat exchanger fins 108 on the warm side outlet as in the first alternate embodiment are no longer needed. The recommended resistive element is a positive temperature coefficient type ceramic element which has the property of increasing electrical resistance with increasing temperature. This feature enhances safety as the element cannot overheat because the increasing resistance limits current flow and hence the maximum temperature of the heating element. While the relative humidity adjustment via sub-cooling, condensate removal and reheating has been described in terms of a multi-stage Peltier module, future improvements in performance of thermoelectric devices including single-stage Peltier modules may enable such relative-humidity adjustments without needing a multi-stage device.

Figure 15:
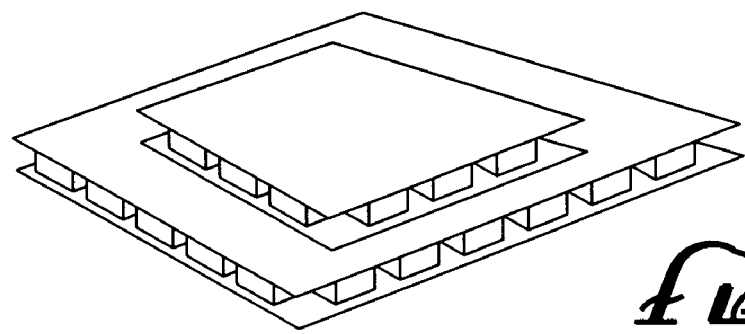
FIG. 15 is a perspective view of a conventional multi-stage thermoelectric device.
Figure 16:
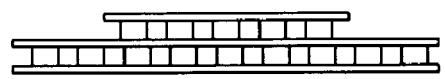
FIG. 16 is a cross-sectional view of the conventional multi-stage thermoelectric device.
Figure 17:
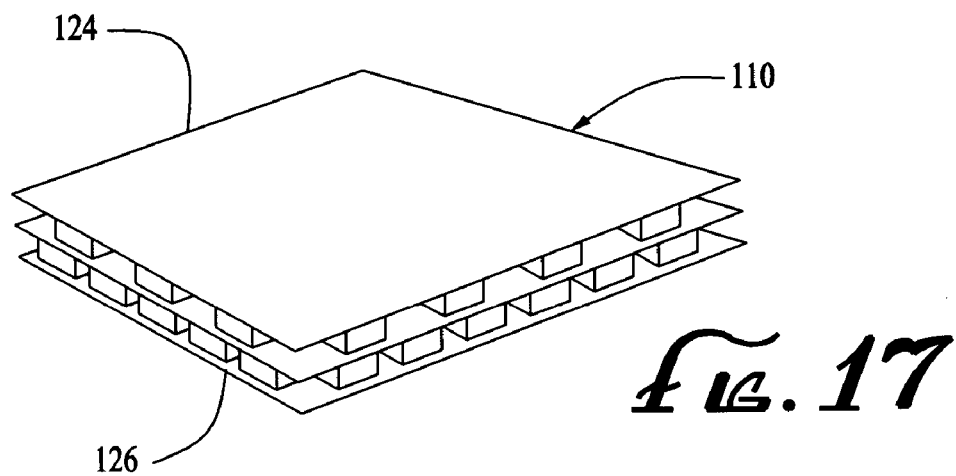
FIG. 17 is a perspective view of the multi-stage thermoelectric device of the alternate embodiments.
Figure 18:
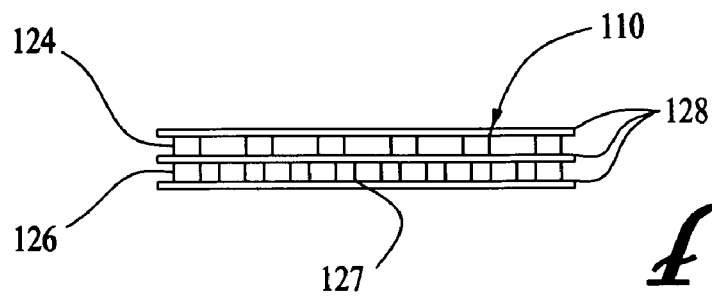
FIG. 18 is a cross-sectional view of the multi-stage thermoelectric device of the alternate embodiments.

FIGS. 15-18 show the prior art and multi-stage thermoelectric device 110 of the alternate embodiments of the present invention. FIGS. 15, 16 shows a conventional two-stage Peltier effect module with the upper and lower stages sharing a common middle wall for superior thermal conductivity but upper stage being significantly smaller than the lower stage. This is because the lower stage must pump out all the heat from the upper stage or thermal stresses on the common middle wall can cause cracking at the interface between the two stages. FIGS. 17, 18 show a two stage Peltier effect module with a less dense upper stage 124 spread out over the area of the lower stage 126. Alternatively, rather than reducing the number of pellets 127 approximately 50%, their size could be cut in half. Either way, this configuration improves the efficiency of the device as the heat being transferred is able to travel in a straight line across the module, reducing the thermal impedance. Bismuth telluride pellets 127 and alumina ceramic plate insulators 128 are the most common materials currently being used in Peltier effect modules.

Having described the structure and hardware of the variable temperature cushion 30 and heat pumps 50, 100 and 120, their operation, function and use may be discussed. The cushion 30 is placed atop a conventional vehicle seat and the heat pump 50, 110 or 120 secured preferably at the bite line between the seat rest 32 and backrest 34, or alternatively forward of the seat rest 32 or above the backrest 34, using the appropriate air ducts 94, and 95 or 96. The heat pump 50, 110 or 120 is turned on by controls directly on the unit itself or a wired or remote control (not shown). The blower motor 70 causing the impellors 74 to rotate and draw in ambient air through the inlet opening 56 into the upper portion 68 of the housing. The air continues to travel downward into the lower portion 69 of the housing, either the cool side 86 (main heat exchanger) or the warm side 87 (auxiliary heat exchanger) and past the heat exchanger fins 88. The air on the cool side is chilled approximately 18-35 degrees Fahrenheit depending upon the type of Peltier module 80 or 110 in the unit, and the air on the warm side 87 heated approximately 40-50 degrees Fahrenheit.

Especially if the two-stage Peltier module 110 is used and the air cooled 35 degrees it should be well below the dew point and a good amount of condensate should form in the air. The condensate tends to accumulate on the fins 88 and then drip down onto the condensate trap or wick evaporator 92 and be retained therein. The cooler, drier air will pass out the cool outlet 60 and through the ducting 94, 95 or 96 and into the cushion 30. The moisture in the condensate trap 92 will travel along the bottom end 90 of the unit across into the drier, warm side 87, where the warm air passing by will cause it to evaporate out the warm outlet 66 and into the outside ambient air. Again, especially if the two-stage Peltier module 110 is used, it will be desirable to reheat the cool air back up to a more comfortable temperature about 18-20 degrees below ambient. This is accomplished by the cool air passing through a second heat exchanger lower set of heat exchanger fins 108, the heat coming from a passive heating element 102 (extending from the warm side 87) or alternatively an active resistance heater 122.

Next the cool air is flowing into the cushion 30 and through the tubular space layer 36 away from the heat pump 50, 110 or 120. Some of the cooled air may bleed through an air-permeable cushion cover 40 and/or the cooled air is released through small vents or ducting in the cushion 30 remote from the entry point of the cooled air. The damper valve 98 may be utilized, either in a wide open, partially closed or completely closed state as desired by the user, to control the flow of air and thereby the temperature of the seat rest 32 portion relative the backrest 34 portion of the cushion. Although the embodiments described thus far have been directed to a variable temperature cushion 30 for placement on a vehicle seat, the technology presented herein is applicable to cooled (or heated) mattress pads, futons, and other articles worn by persons such as helmets, vests, etc.

Figure 19:
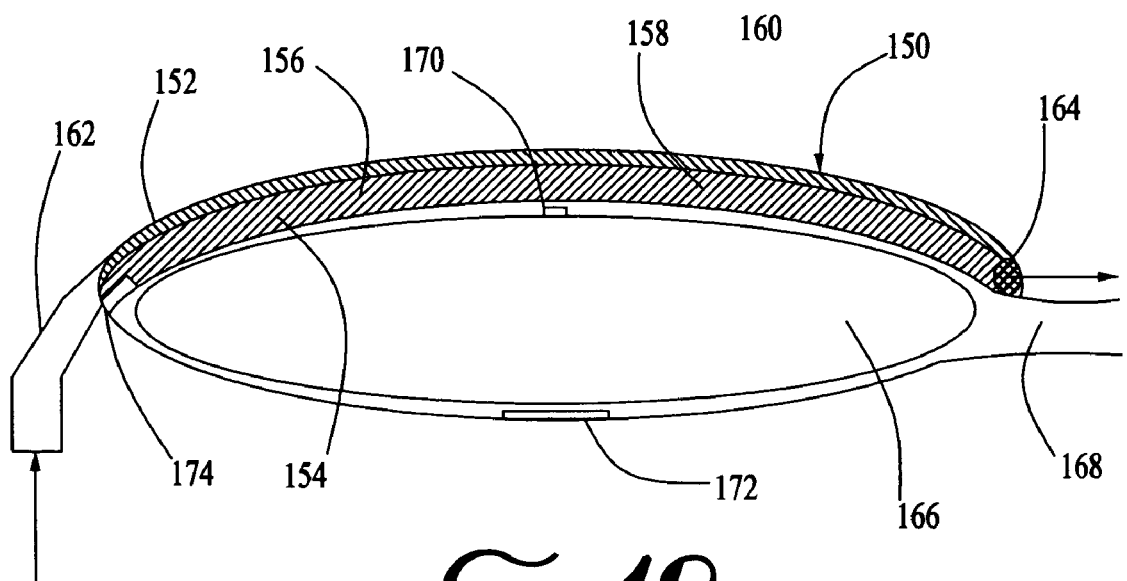
FIG. 19 is a side elevation view of the pillow and pillowcase of a preferred embodiment of the present invention including the optional noise cancellation system.
Figure 20:
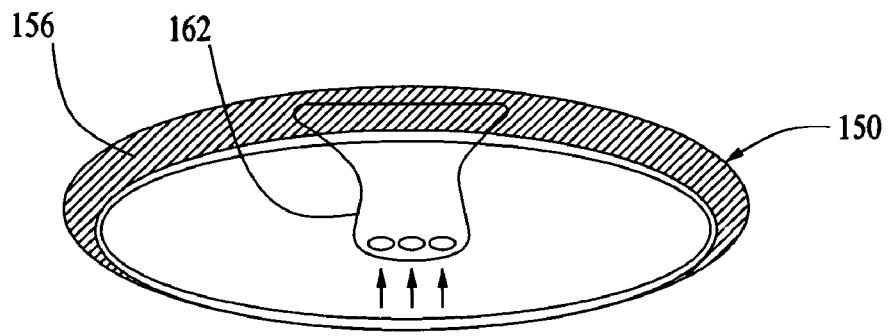
FIG. 20 is an end elevation view showing the pillow and pillow case including the multi-channel air duct; and, FIG. 21 is a top plan view of the pillow and pillowcase showing the perimeter air vents.
Figure 21:
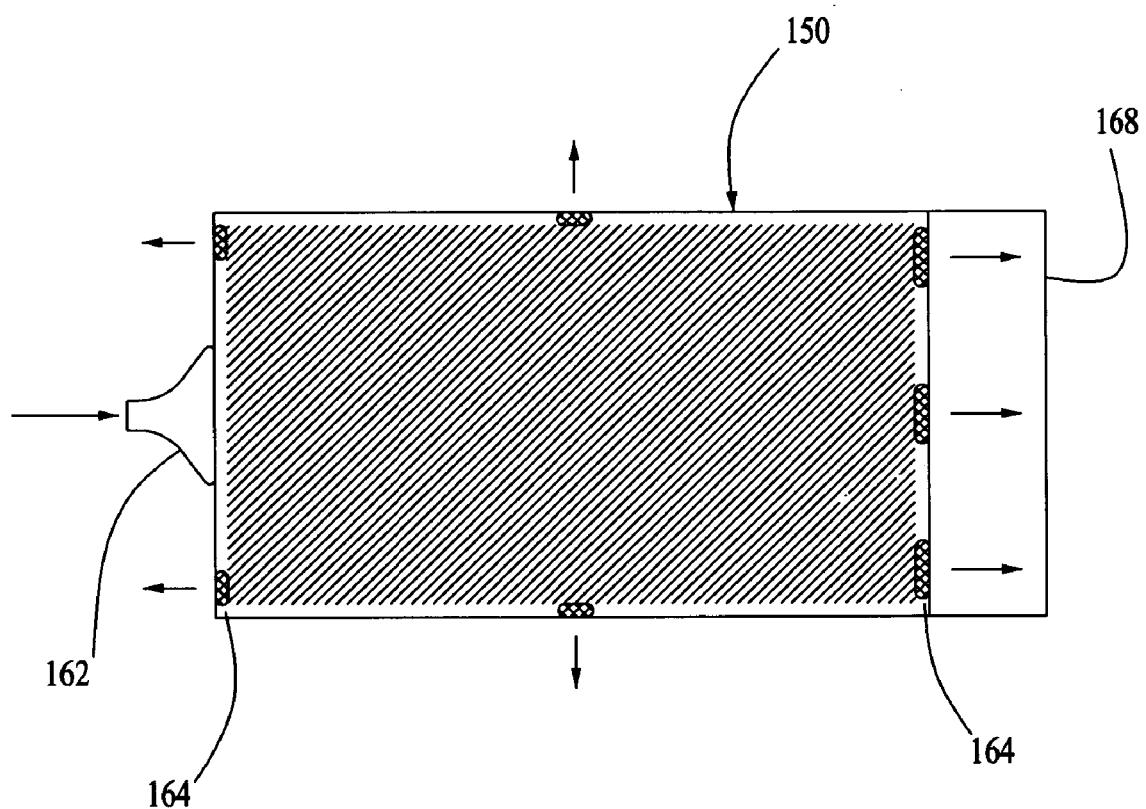

Now referring to FIGS. 19-21, an air-conditioned pillow system is illustrated. It includes a pillowcase 150 having an upper 152 and lower 154 fabric-like, preferably air-impervious layers that form a plenum 156 or enclosed pressurized space. Within the plenum 156 are a tubular spacer air flow layer 158 and optional top batting layer 160. The inlet nozzle 162 preferably includes multiple channels for three (3) or more pressurized air hoses from a heat pump (not shown) to minimize the noise associated with the air flow. Around the perimeter of the plenum 156 are approximately seven (7) spaced-apart outlet vents 164. Beneath the tubular spacer layer 158 is a conventional pillow 166 and an opening 168 for the pillow 166 in the pillowcase 150. Alternatively, the pillow 166 could be located inside the plenum 156. Optionally, the air conditioned pillow may also have an active noise cancellation system including a miniature microphone 170, a processing unit 172 and playback speaker 174 electrically connected together.

The air-conditioned pillow system operates and functions as follows. The multi-channel inlet nozzle 162 is connected to a heat pump and a stream of air-conditioned air, be it cool with reduced humidity or warm, is quietly supplied to the plenum 156 or enclosed space in the top portion of the pillowcase 150. The conditioned air travels through the tubular spacer layer 158 towards the outlet vents 164, thereby cooling (or warming) the top outer surface of the pillowcase. Optionally, the noise cancellation system samples a noise source through a miniature microphone 170 and sends it to a processing unit 172, which analyzes the noise and creates a waveform 180 degrees out of phase with the source which is broadcast through the speaker 174. The user is able to control the temperature of the pillowcase 150 in accordance with his or her preferences.

The present invention has been described in connection with preferred and alternate embodiments, but it is understood that modifications will occur to those skilled in the appertaining arts that are within the spirit of the invention disclosed and within the scope of the claims.

What is claimed is:

1. A thermoelectric heat pump comprising:
   a housing having a top end with an inlet opening to allow in outside air, having an upper and a lower portion and a bottom end inside the housing, and cool and warm outlets proximate the bottom end of the housing,
   a blower motor mounted in the upper portion of the housing to draw in the outside air through the inlet opening and cause the air to flow into the lower portion of the housing;
   a thermoelectric device mounted in the lower portion and extending to the bottom end of the housing and forming a sealed wall between a warm side and a cool side of the housing; and,
   a condensate trap mounted across the bottom end of the housing and spanning the warm and cool sides of the housing to transfer condensate from the cool side to the warm side;
   whereby the outside air is drawn into the heat pump and cooled on the cool side and heat transferred to the warm side, and cooled air passed out the cool outlet and warmed air passed out the warm outlet, and condensate transferred from the cool side to the warm side and evaporated out the warm outlet 2. The thermoelectric heat pump of claim 1 wherein the thermoelectric device is a Peltier effect module.

3. The thermoelectric heat pump of claim 1 further comprising a plurality of heat exchanger fins in thermal communication with the thermoelectric device.

4. The thermoelectric heat pump of claim 1 wherein the Peltier effect module is a multi-stage device having a first stage and a second stage.

5. The thermoelectric heat pump of claim 1 further comprising a passive heating element in thermal communication with the warm and cool sides of the lower portion of the housing, to transfer heat from the warm side to the cool side and thereby warm up the air exiting through the cool outlet.

6. The thermoelectric heat pump of claim 5 further comprising a plurality of heat exchanger fins in thermal communication with the passive heating element.

7. The thermoelectric heat pump of claim 4 further comprising a resistance heater in thermal communication with the cool side of the lower portion of the housing to warm up the air passing through the cool outlet.

8. The thermoelectric heat pump of claim 4 wherein the first and second stages have conductor plates of approximately the same size and a shared conductor plate, and wherein the first stage comprises approximately 50% volume of pellets as the second stage and the pellets are approximately evenly distributed across the first and second stages.

9. The thermoelectric heat pump of claim 1 wherein the blower is a single vane-axial blower.

10. A variable temperature cushion comprising:
a cushion having an interior volume defining a plenum to accept pressurized conditioned air;
a thermoelectric heat pump located proximate the cushion comprising:
a housing having a top end with an inlet opening to allow in outside air, having an upper and a lower portion and a bottom end inside the housing, and cool and warm outlets proximate the bottom end of the housing,
a blower motor mounted in the upper portion of the housing to draw in the outside air through the inlet opening and cause the air to flow into the lower portion of the housing;
a thermoelectric device mounted in the lower portion and extending to the bottom end of the housing and forming a sealed wall between a warm side and a cool side of the housing; and,
a condensate trap mounted across the bottom end of the housing and spanning the warm and cool sides of the housing to transfer condensate from the cool side to the warm side;
whereby the outside air is drawn into the heat pump and cooled on the cool side and heat transferred to the warm side, and cooled air passed out the cool outlet and warmed air passed out the warm outlet, and condensate transferred from the cool side to the warm side and evaporated out the warm outlet; and,
an air duct running from the cool outlet of the thermoelectric heat pump into the plenum of the cushion.

11. The variable temperature cushion of claim 10 wherein the air duct connects to a middle portion of the cushion.

12. The variable temperature cushion of claim 10 wherein the cushion is a seat and backrest combination.

13. The variable temperature cushion of claim 10 wherein the cushion further comprises an inner layer of tubular spacer material.

14. The variable temperature cushion of claim 12 wherein the top surfaces of the cushion are formed from an air permeable material.

15. The variable temperature cushion of claim 10 further comprising a plurality of vents in the cushion remote from the air duct.

16. The variable temperature cushion of claim 12 wherein the air duct connects proximate a forward end of the seat.

17. The variable temperature cushion of claim 12 wherein the air duct connects proximate a top end of the backrest.

18. The variable temperature cushion of claim 10 further comprising a damper valve mounted a middle portion in the cushion to control air flow in the plenum.

19. The variable temperature cushion of claim 10 wherein the thermoelectric device is a Peltier effect multi-stage module having a first stage and a second stage.

20. The thermoelectric heat pump of claim 19 wherein the thermoelectric heat pump further comprising a heat pipe in thermal communication with the warm and cool sides of the lower portion of the housing to transfer heat from the warm side to the cool side and thereby warm up the air exiting through the cool outlet.

21. A kit for converting a conventional cushion into a variable temperature cushion comprising:
a thermoelectric heat pump comprising:
a housing having a top end with an inlet opening to allow in outside air, having an upper and a lower portion and a bottom end inside the housing, and cool and warm outlets proximate the bottom end of the housing,
a blower motor mounted in the upper portion of the housing to draw in the outside air through the inlet opening and cause the air to flow into the lower portion of the housing;
a thermoelectric device mounted in the lower portion and extending to the bottom end of the housing and forming a sealed wall between a warm side and a cool side of the housing; and,
a condensate trap mounted across the bottom end of the housing and spanning the warm and cool sides of the housing to transfer condensate from the cool side to the warm side;
whereby the outside air is drawn into the heat pump and cooled on the cool side and heat transferred to the warm side, and cooled air passed out the cool outlet and warmed air passed out the warm outlet, and condensate transferred from the cool side to the warm side and evaporated out the warm outlet; and,
an air duct for running from the cool outlet of the thermoelectric heat pump into the cushion;
a plurality of vents to be located in the cushion remote from the air duct to facilitate circulation of the cooled air.

22. The variable temperature cushion of claim 20 wherein the thermoelectric device is a Peltier effect multi-stage module having a first stage and a second stage.

23. The thermoelectric heat pump of claim 20 wherein the thermoelectric heat pump further comprises a heating element in thermal communication with the cool side of the lower portion of the housing to receive heat and warm up the air exiting through the cool outlet.

\* \* \* \* \*